United States Patent [19]
Kohzai et al.

[11] 4,439,703
[45] Mar. 27, 1984

[54] DIRECT CURRENT MOTOR

[75] Inventors: Yoshinori Kohzai, Hino; Shigeaki Oyama, Hachioji, both of Japan

[73] Assignee: Fujitsu Fanuc Limited, Tokyo, Japan

[21] Appl. No.: 95,985

[22] Filed: Nov. 20, 1979

[30] Foreign Application Priority Data

Jul. 31, 1978 [JP] Japan .................................. 53-92557

[51] Int. Cl.³ .............................................. H02K 1/10
[52] U.S. Cl. ..................................... 310/186; 310/216
[58] Field of Search ....................... 310/186, 216–218, 310/154

[56] References Cited

U.S. PATENT DOCUMENTS

| | | | |
|---|---|---|---|
| 2,303,293 | 11/1942 | Thomar | 310/186 |
| 2,394,075 | 2/1946 | Kimball | 310/186 |
| 3,576,456 | 4/1971 | De Wolf | 310/186 |
| 4,220,882 | 9/1980 | Kohzai et al. | 310/186 |
| 4,374,337 | 2/1983 | Kohzai et al. | 310/186 X |

FOREIGN PATENT DOCUMENTS 53-126107 of 0000 Japan .

*Primary Examiner*—Donovan F. Duggan
*Attorney, Agent, or Firm*—Armstrong, Nikaido, Marmelstein & Kubovcik

[57] ABSTRACT

A direct current motor comprising: a yoke; an armature; a plurality of main magnetic poles equidistantly spaced around the inner circumference of the yoke, and each of which has a wide portion and a narrow portion, the air-gap between the armature and the main magnetic poles being narrow at the center and ends of the wide portion, and at the center of the narrow portion, and being wide at the intermediate of the wide portion, and at the ends of the narrow portion, and a plurality of interpoles, such as E-shaped interpoles, which are disposed at positions located between the adjacent narrow portions of the main magnetic poles.

6 Claims, 8 Drawing Figures

DIRECT CURRENT MOTOR

The present invention relates generally to a direct current motor and, more particularly, to construction of main magnetic poles of a direct current motor (hereinafter referred to as a DC motor).

In general, a DC motor comprises a yoke, a plurality of main magnetic poles equidistantly spaced around the inner circumference of the yoke and an armature having armature windings wound thereon. In the DC motor, interactions between the magnetic flux produced by armature current which flows in the armature windings and that produced by the main magnetic poles are caused, which interactions are so-called "armature reactions". The armature reactions are, for example, (a) displacement of electrically neutral axes from geometric neutral axes, (b) decrease of the total magnetic flux (c) non-uniformity of magnetic flux density and local high magnetic flux density generated on armature windings.

When a brush in contact with a commutator is disposed on the geometric neutral axis, the voltage induced in the armature windings located in a commutating zone due to the above-mentioned reason (a) is shorted at the brush and a spark is generated. Consequently, degradation of the commutating characteristics is caused.

On the other hand, when the magnitude of the local high magnetic flux exceeds a predetermined value, the voltages of commutator segments, connected to armature windings disposed in the portion where such local high magnetic flux is generated, also exceed a predetermined value. As a result, an electrical discharge between the commutator segments is generated, and finally, the brushes whose polarities are opposite from each other are shorted. The electrical discharge is called a "flashover".

In order to obviate the above-mentioned degradation of the commutating characteristics, the prior art DC motor comprises interpoles disposed between the main magnetic poles. Each of the interpoles produces a magnetomotive force which can eliminate a counter electromotive force induced in the armature windings and a magnetomotive force which can eliminate a magnetomotive force generated by armature current flowing in the armature windings. It should be mentioned that it is unnecessary to dispose the interpoles uniformly along the lengthwise direction of the direct current motor. As an example of an interpole, an E-shaped interpole which is magnetically insulated from the yoke is provided in U.S. Application No. 298,825. The E-shaped interpole has a smaller cross-sectional area but a larger width than a conventional interpole. Therefore, it is preferable from the view-point of manufacturing the DC motor that the E-shaped interpoles be disposed partially along the lengthwise direction of the DC motor. In this case, a main magnetic pole has a wide portion adjacent to other main magnetic poles and a narrow portion adjacent to the E-shaped interpoles.

In order to obviate the above-mentioned "flashover", the air-gap between the main magnetic pole and the armature is made wide at each end of the main magnetic pole and is narrow at the center of the main magnetic pole, since local high magnetic flux is generated at an end of the main magnetic pole. However, in the prior art DC motor wherein each of the main magnetic poles has a wide portion and a narrow portion, the magnetic flux densities generated at the ends of the wide portions are extremely small compared with the magnetic flux density generated at the center of the main magnetic poles. As a result, the total magnetic flux generated on the armature windings becomes small, which causes degradation of the performance of the DC motor, since the electromotive force induced in the armature windings becomes small. Therefore, in order to increase the performance of the DC motor, it is necessary to lengthen the main magnetic poles in the lengthwise direction of the DC motor, and accordingly, to lengthen the size of the DC motor.

It is an object of the present invention to provide a DC motor comprising a plurality of main magnetic poles, each of which has a wide portion and a narrow portion due to the presence of interpoles, such as E-shaped interpoles, which DC motor is small in size.

According to the present invention, there is provided a direct current motor comprising: a yoke; an armature disposed at the center of the yoke and having armature windings wound thereon; a plurality of main magnetic poles equidistantly spaced around the inner circumference of the yoke, and each of which has a wide portion and a narrow portion, the air-gap between the armature and the main magnetic poles being narrow at the center and ends of the wide portion, and at the center of the narrow portion, and being wide at the parts of the wide portion which are located between the center and the ends thereof, and at the ends of the narrow portion, an electromotive force induced in each of the armature windings being smaller than a predetermined value, and; a plurality of interpoles disposed at positions located between the adjacent narrow portions of the main magnetic poles. In the above-mentioned DC motor, the air-gap between the armature and the main magnetic poles is selected to be as narrow as possible and, accordingly, the electromotive force induced in the armature windings becomes large, which force is, however, lower than a predetermined value. Therefore, generation of a flashover on a commutator is also avoided. Consequently, the DC motor is relatively short in the lengthwide direction thereof.

The present invention will be more clearly understood from the following description with reference to the accompanying drawings wherein.

Figure 1:
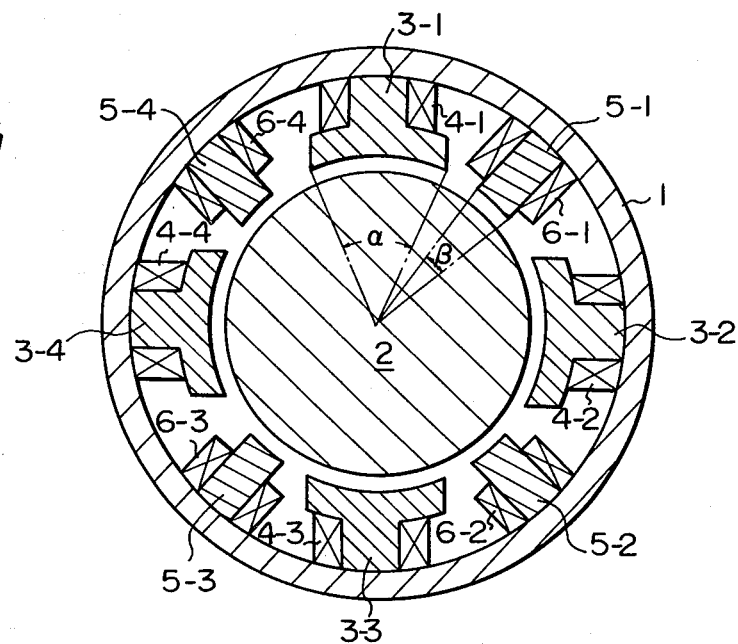
FIG. 1 is a cross-sectional view of the prior art DC motor having conventional interpoles disposed between main magnetic poles.

Referring to FIG. 1, the prior art DC motor comprises a yoke 1, and armature 2 disposed at the center of the yoke 1, four main magnetic poles 3-1, 3-2, 3-3 and 3-4 equidistantly spaced around the inner circumstance of the yoke 1 associated with field windings 4-1, 4-2, 4-3 and 4-4, respectively, and four interpoles 5-1, 5-2, 5-3 and 5-4 disposed at positions located between two adjacent main magnetic poles 3-1, 3-2, 3-3 and 3-4 and associated interpole windings 6-1, 6-2, 6-3 and 6-4, respectively. The interpoles 5-1, 5-2, 5-3 and 5-4 produce magnetomotive forces which can eliminate counter electromotive forces induced in armature windings (not shown), and magnetomotive forces which can eliminate a magnetomotive force generated by armature current flowing in the armature windings. As a result, the commutating characteristics can be improved.

Figure 2:
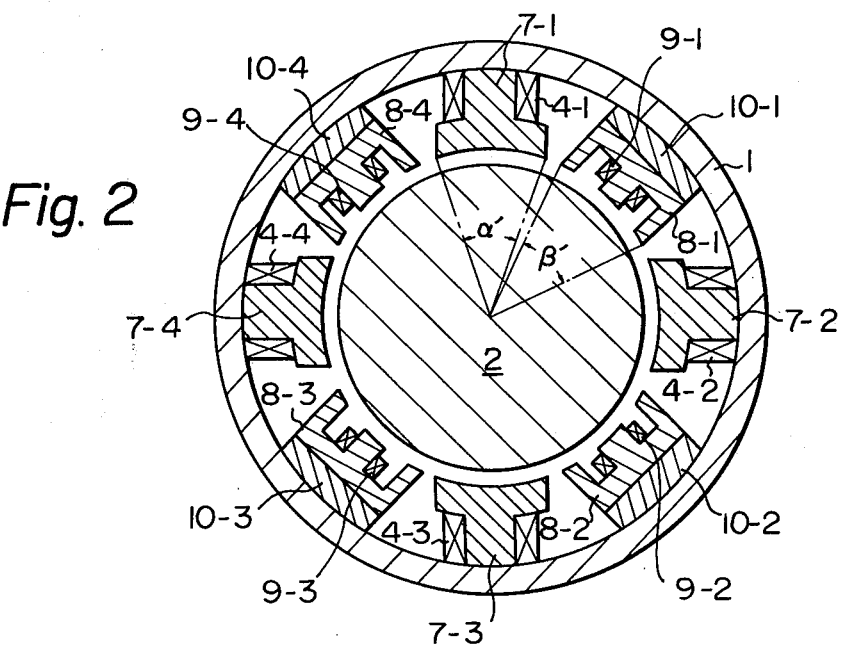
FIG. 2 is a cross-sectional view of the prior art DC motor having E-shaped interpoles disposed between main magnetic poles.

FIG. 2 is a cross-sectional view of the prior art DC motor having E-shaped interpoles disposed between main magnetic poles. The elements illustrated in FIG. 2 which are identical to those of FIG. 1 have been given the same reference numerals as used in FIG. 1. E-shaped interpoles 8-1, 8-2, 8-3 and 8-4 are insulated from the yoke 1 by inserting spacers 10-1, 10-2, 10-3 and 10-4, such as non-magnetic materials or air-gaps between the yoke 1 and the interpoles 8-1, 8-2, 8-3 and 8-4, respectively. As will be understood from FIGS. 1 and 2, the E-shaped interpoles 8-1, 8-2, 8-3 and 8-4 are wider than the conventional interpoles 5-1, 5-2, 5-3 and 5-4 (FIG. 1), i.e., $\beta$(FIG. 1) $< \beta'$(FIG. 2). However, it should be noted that, the cross-sectional area of the E-shaped interpole 8-1 (8-2, 8-3 and 8-4) is smaller than that of the conventional interpole 5-1 (5-2, 5-3 and 5-4) (FIG. 1). In addition, the E-shaped interpoles 8-1, 8-2, 8-3 and 8-4 are disposed partly along the lengthwise direction of the DC motor. As a result, main magnetic poles 7-1, 7-2, 7-3, and 7-4 should be narrower than the main magnetic poles 3-1, 3-2, 3-3 and 3-4 (FIG. 1), i.e., $\alpha$(FIG. 1) $> \alpha'$(FIG. 2). In order to increase the total magnetic flux generated between the armature 2 and the main magnetic poles 7-1, 7-2, 7-3 and 7-4, in other words, in order to increase the performance of the DC motor, the cross-sectional areas of the main magnetic poles 7-1, 7-2, 7-3 and 7-4 should be as large as possible. Therefore, the main magnetic poles 7-1, 7-2, 7-3 and 7-4 are structured as shown in FIG. 3.

Figure 3:
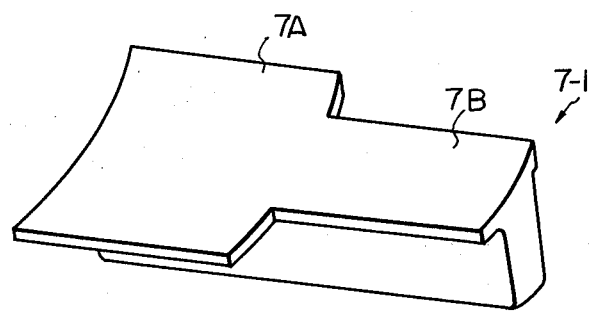
FIG. 3 is a perspective view of a main magnetic pole of FIG. 2.

In FIG. 3, the main magnetic pole 7-1 (7-2, 7-3 and 7-4) has a wide portion 7A and a narrow portion 7B, due to the presence of the E-shaped interpoles 8-1, 8-2, 8-3 and 8-4. In other words, the wide portion 7A of one main magnetic pole is disposed adjacent to other wide portions 7A of other main magnetic poles, while the narrow portion 7B of one main magnetic pole is disposed adjacent to two of the E-shaped interpoles 8-1, 8-2, 8-3 and 8-4 (FIG. 2).

Figure 4:
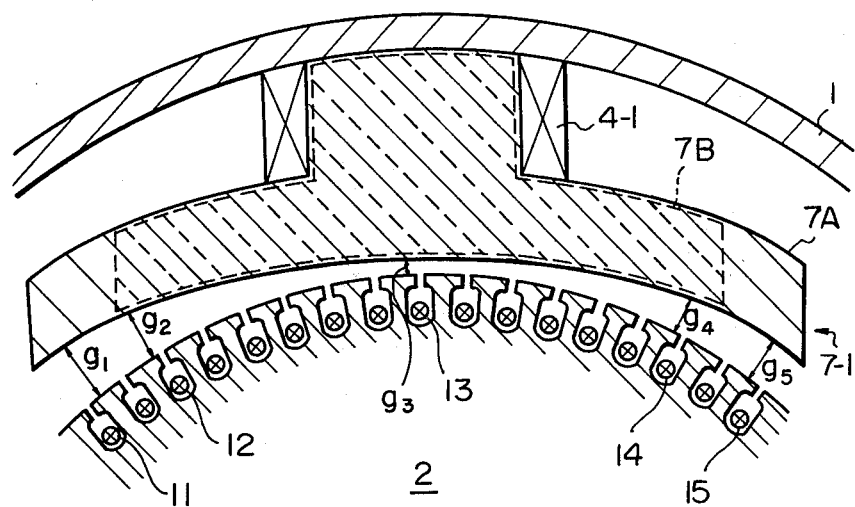
FIG. 4 is a partial enlarged cross-sectional view of a main magnetic pole of FIG. 2.

FIG. 4 is a partial enlarged cross-sectional view of a main magnetic pole 7-1 of FIG. 2, showing an air-gap between the main magnetic pole 7-1 and the armature 2. It is well known that local high magnetic flux density is generated at one end of the main magnetic pole 7-1, if the air-gap is uniform. In FIG. 4, the air-gap $g_3$ at the center of the main magnetic pole 7-1 is narrow, while the air-gaps $g_1$, $g_2$, $g_4$ and $g_5$ at the ends of the wide portion 7A and the narrow portion 7B are wide. Thus, the magnitude of the local high magnetic flux density becomes small which is helpful for avoiding the generation of a "flashover". However, an electromotive force induced in an armature winding 11 or 15 is extremely small compared with an electromotive force induced in an armature winding 12, 13 or 14, since the total length of the main magnetic pole 7-1 is usually several times of that of the wide portion 7A of the pole 7-1. As a result, the outside parts of the wide portion 7A do not contribute to the total magnetic flux under the main magnetic pole 7-1 and, accordingly, do not contribute to the performance of the DC motor.

Figure 5:
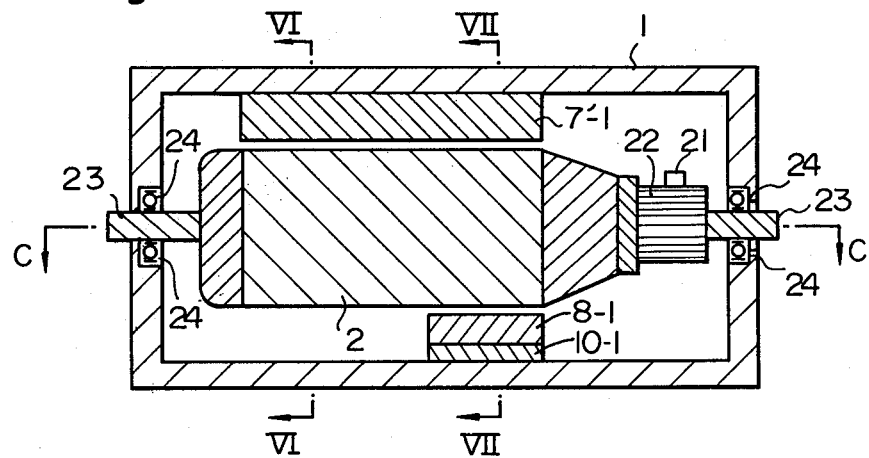
FIG. 5 is a longitudinal cross-sectional view illustrating an embodiment of the DC motor of the present invention.

FIG. 5 is a longitudinal cross-sectional view illustrating an embodiment of the DC motor of the present invention. In FIG. 5, the plane indicated by the cross-section upper the line C-C is at an angle of 45° with respect to the plane indicated by the cross-section below the line C-C. A main magnetic pole 7'-1 fixed to the inner surface of a yoke 1 is as long as an armature 2, while an E-shaped interpole 8-1 associated with a spacer 10-1 composed of non-magnetic material or an air-gap is shorter than the armature 2. The structure of the main magnetic pole 7'-1 is similar to that of the main magnetic pole 7-1 illustrated in FIG. 3. An armature current flows from a brush 21, through a commutator segment of a commutator 22, armature windings of the armature 2, another commutator segment of the commutator 22, to another brush (not shown). Each of the brushes is disposed in a commutating zone of the commutator 22. A shaft 23 fixed to the armature 2 is supported by bearings 24. Thus, the E-shaped interpole 8-1 is disposed partially in the lengthwise direction of the armature 2.

Figure 6:
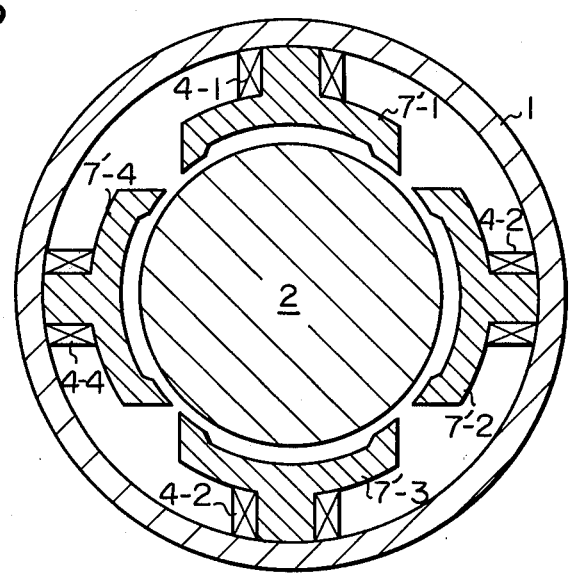
FIG. 6 is a cross-sectional view taken along the line VI—VI of FIG. 5.
Figure 7:
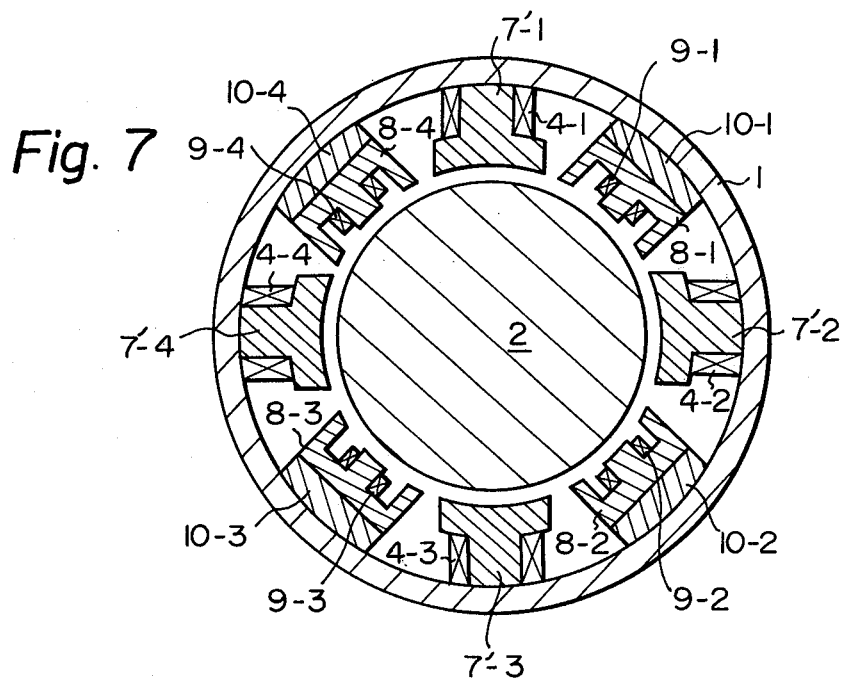
FIG. 7 is a cross-sectional view taken along the line VII—VII of FIG. 5.

FIGS. 6 and 7 are cross-sectional views taken along the line VI—VI and the line VII—VII, respectively, of FIG. 5. As illustrated in FIGS. 6 and 7, four main magnetic poles 7'-1, 7'-2, 7'-3 and 7'-4 are disposed equidistantly on the inner circumference of the yoke 1, and four E-shaped interpoles 8-1, 8-2, 8-3 and 8-4 are disposed between the adjacent main magnetic poles 7'-1, 7'-2, 7'-3 and 7'-4. In addition, each of the main magnetic poles 7'-1, 7'-2, 7'-3 and 7'-4 has a wide portion with an end part 7'a and a narrow portion due to the presence of the E-shaped interpoles 8-1, 8-2, 8-3 and 8-4.

Figure 8:
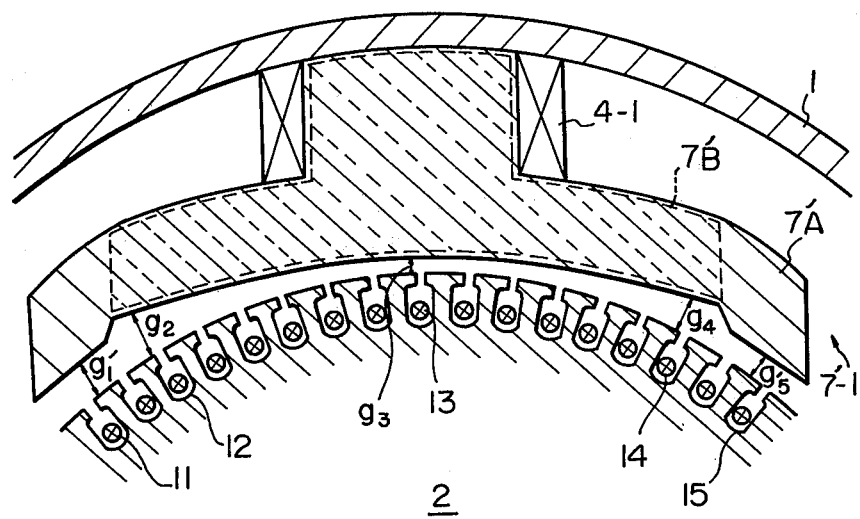
FIG. 8 is a partial enlarged cross-sectional view of a main magnetic pole of FIG. 5.

FIG. 8 is a partial enlarged cross-sectional view of a main magnetic pole of FIG. 5, showing an air-gap between the magnetic pole 7'-1 and the armature 2. In general, when a conductive line of a length $L(m)$ is moved at a speed of $v(m/s)$ in a magnetic flux density $B(Wb/m^2)$ whose direction is perpendicular to the conductive line, an electromotive force $E(V)$ induced in the conductive line is defined as follows.

$$E = BLv$$

Therefore, electromotive forces $E_1$, $E_2$, $E_3$, $E_4$ and $E_5$ induced in the armature windings 11, 12, 13, 14 and 15, respectively, are defined as follows.

$$E_1 = B_1 l_2 v_0$$

$$E_2 = B_2 l_1 v_0$$

$$E_3 = B_3 l_1 v_0$$

$$E_4 = B_4 l_1 v_0$$

$$E_5 = B_5 l_2 v_0$$

Where $B_1$, $B_2$, $B_3$, $B_4$ and $B_5$ are magnetic flux densities in the neighborhoods of the armature windings 11, 12, 13, 14 and 15, respectively;

$l_1$ is a total length of the main magnetic pole 7'-1;

$l_2$ is a length of the end part 7'A of the main magnetic pole 7'-1, and;

$v_0$ is a circumferential speed of the armature 2.

In order to avoid the generation of a "flashover," the values of $E_1$, $E_2$, $E_3$, $E_4$ and $E_5$ should be lower than a predetermined value, but from the view-point of the performance of the DC motor, the values of $E_1$, $E_2$, $E_3$, $E_4$ and $E_5$ should be as large as possible. Since $l_1$ is several times $l_2$, the air-gaps $g_1'$, and $g_5'$ at the ends of the end part 7'A are selected to be narrower than the air-gaps $g_2$ and $g_4$ at the ends of the narrow portion 7'B, and at the intermediate of the end part 7'A. Therefore, the magnetic flux densities $B_1$ and $B_5$ are larger than the magnetic flux densities $B_2$ and $B_4$, respectively. As a result, the electromotive forces $E_1$ and $E_5$ become large and, accordingly, all the electromotive forces induced in the armature 2 become large compared with those induced in the armature 2 in FIG. 4.

It should be noted that the DC motor of the present invention can comprise other type of interpoles than the E-shaped interpoles, if each of main magnetic poles has a wide portion and a narrow portion. In addition, the number of poles in the above-mentioned DC motor can be changed to six or more. Furthermore, the main magnetic poles 7'-1, 7'-2, 7'-3 and 7'-4 can be made of permanent magnetic materials. In this case, field windings 4-1, 4-2, 4-3 and 4-4 can be omitted.

As explained hereinbefore, the DC motor according to the present invention has the advantages, as compared with the prior art DC motor, that the DC motor is small in size, because the outside parts of the wide portions of the main magnetic poles contribute to the total magnetic flux under the main magnetic poles and, accordingly, the main magnetic poles are shorter than those of the prior art in the lengthwise direction thereof, which causes the armature to be shortened and also causes the entire DC motor to be shorter than the prior art.

What is claimed is:

1. A direct current motor, comprising:

a yoke;

an armature disposed at the center of said yoke having armature windings wound thereon;

a plurality of main magnetic poles equidistantly spaced around the inner circumference of said yoke, each of said main magnetic poles having a wide portion and a narrow portion, only said wide portion including an end part integrally formed at each end thereof, wherein the air-gap between said armature and said main magnetic poles is narrow at the center of said wide portion and at the center of said narrow portion and increases as the distance from the center portion increases and wherein the air-gap between said armature and said end parts is narrow and wherein an electromotive force is induced in each of said armature windings which is smaller than a predetermined value; and a plurality of interpoles disposed at positions located between said adjacent narrow portions of said main magnetic poles.

2. A direct current motor as set forth in claim 1, including spacer means positioned between said interpoles, E-shaped interpoles and said yoke.

3. A direct current motor as set forth in claim 2, wherein said spacer means is a non-magnetic material formed between said yoke and each of said E-shaped interpoles.

4. A direct current motor as set forth in claim 2, wherein said spacer means is an air-gap formed between said yoke and each of said E-shaped interpoles.

5. A direct current motor as set forth in claim 1 wherein each of said main magnetic poles includes of an electromagnet having field windings thereon.

6. A direct current motor as set forth in claim 1, wherein each of said main magnetic poles includes of a permanent magnet.

* * * * *